March 6, 1962 A. G. AVILA 3,023,713
ROLL MAKING APPARATUS
Filed June 22, 1959 7 Sheets-Sheet 2

FIG.2

INVENTOR.
ABELARDO G. AVILA
BY Otto Moeller
Attorney

March 6, 1962  A. G. AVILA  3,023,713
ROLL MAKING APPARATUS
Filed June 22, 1959  7 Sheets-Sheet 3

INVENTOR.
ABELARDO G. AVILA
BY Otto Moeller
Attorney

March 6, 1962 A. G. AVILA 3,023,713
ROLL MAKING APPARATUS
Filed June 22, 1959 7 Sheets-Sheet 4

INVENTOR.
ABELARDO G. AVILA
BY Otto Moeller
Attorney

March 6, 1962 A. G. AVILA 3,023,713
ROLL MAKING APPARATUS
Filed June 22, 1959 7 Sheets-Sheet 5

FIG. 7

INVENTOR.
ABELARDO G. AVILA
BY *Otto Moeller*
Attorney

March 6, 1962 A. G. AVILA 3,023,713
ROLL MAKING APPARATUS
Filed June 22, 1959 7 Sheets-Sheet 7

FIG. 9

INVENTOR.
ABELARDO G. AVILA
BY Otto Moeller
Attorney 3,023,713
ROLL MAKING APPARATUS
Abelardo G. Avila, York, Pa., assignor to Capitol Products Corporation, Mechanicsburg, Pa., a corporation of Pennsylvania
Filed June 22, 1959, Ser. No. 822,084
5 Claims. (Cl. 107—7)

This invention relates to dough roll forming apparatus and more particularly to rolls of the type having lines of separation along which they are readily split when being consumed.

For purpose of illustration, the invention is hereinafter described with reference to the formation of rolls popularly knokn as "cloverleaf" rolls, though it will be apparent that the invention is equally adapted for use in the formation of other types of rolls having lines of separation. These rolls are customarily formed by placing three small balls of dough, to which a vegetable oil has been applied, in each depression of a roll baking pan. The oil provides a severable union between the three dough balls while preventing coalescing thereof, so that the finally baked roll is readily split along the adhering oiled surfaces of the dough balls.

The present invention has among its objects the provision of a machine for continuously dividing lumps of dough into three substantially equal pieces, forming and panning each group of three dough balls and automatically spraying on each group of three dough balls a measured amount of oil. A related object is to provide means for intermittently actuating the oil spray means in synchronism with intermittent advancement of the pans for discharging a spray of oil on the groups of three dough balls deposited in the several transversely spaced pan depressions of a roll baking pan, thereby effecting a saving in oil and resulting in a cleaner apparatus.

A further object of the invention is to provide a roll forming and panning machine, wherein the dough pieces are formed and delivered to the pans in a plurality of longitudinal rows and means is provided for maintaining the rows of formed pieces apart as they are delivered to and accurately deposited in the pans.

Other objects and advantages more or less ancillary to the foregoing and the manner in which all of the various objects are realized will appear in the following description, which considered in connection with the accompanying drawings, sets forth a preferred embodiment of the invention.

Figure 1:
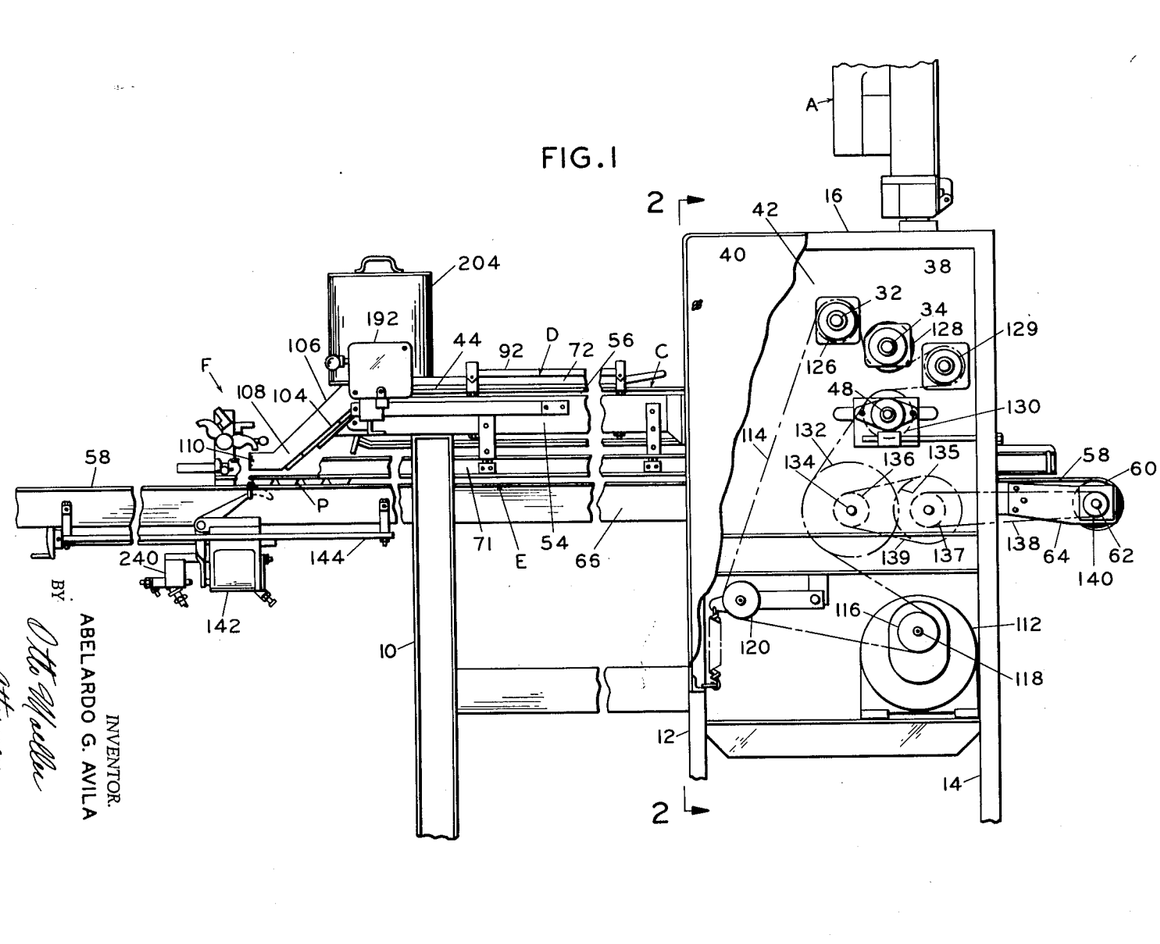
FIGURE 1 is a side elevational view of an automatic roll machine embodying the present invention, parts thereof being broken away.

Referring particularly to FIGURE 1 of the drawings, there is shown an automatic roll moulding and panning apparatus incorporating various novel features which are illustrated in more detail in the other figures of the drawings. Certain features are especially adapted to the forming, treatment and panning of particular types of rolls, such as rolls familiarly known as "cloverleaf" rolls, and the apparatus is hereinafter described with particular reference to production of rolls of this type.

In general the apparatus includes a dough ball distributor A arranged to receive successive dough pieces which have previously been divided into lumps of the desired roll weight, rounded and preferably proofed. The dividing, rounding and proofing means is not shown in the drawings, since such means is well known in the art and constitutes no part of the present invention.

The distributor A translates the single row of continuously on-coming dough balls into four transversely spaced rows for ultimate depositing of the dough pieces into the four rows of depressions of a roll baking pan P. The distributor A may conveniently be of the flip-flop type as shown in my Patent No. 2,670,888, granted March 2, 1954, and Patent No. 2,829,752, granted April 8, 1958, wherein the dough balls are successively dropped to form four rows of dough balls. Since the distributor does not constitute a part of the present invention, the details thereof are not shown or described in the present drawings and description.

Figure 2:
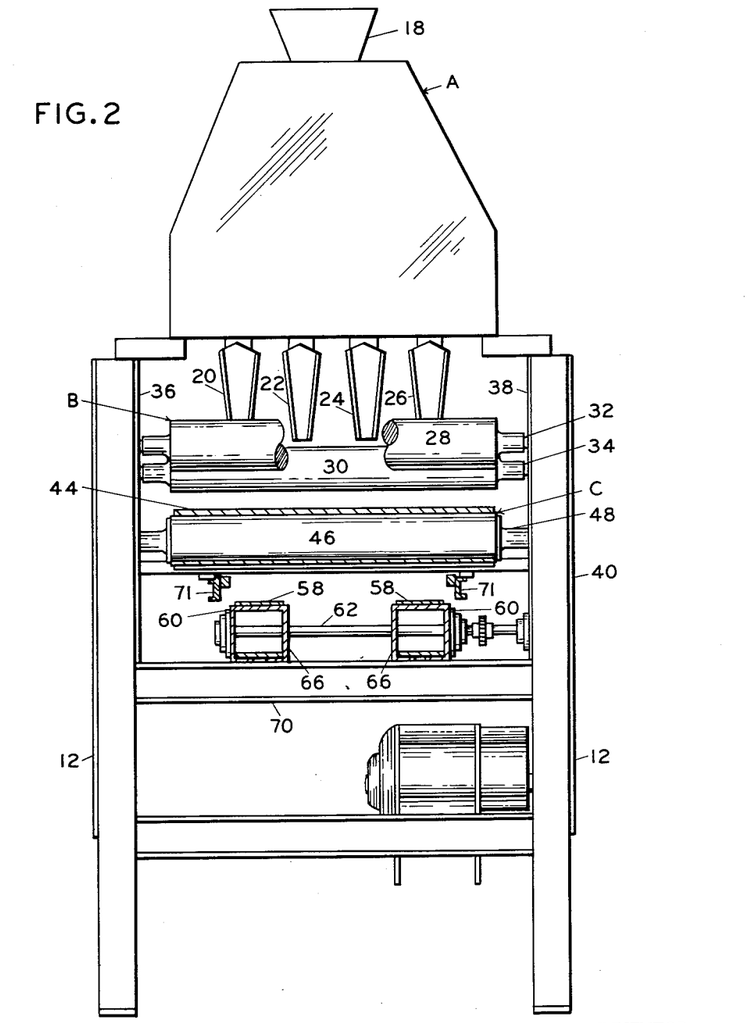
FIGURE 2 is a transverse sectional view taken on the line 2—2 of FIGURE 1.

The four rows of dough balls are delivered from the distributor A to a flattening and sheeting means, shown and indicated in FIGURE 2 by the letter B. The sheeting and flattening means B sheets the dough balls into flat pancake-like form and delivers them onto a dough piece conveyor C which conveys them forwardly beneath a coiling, kneading and forming means D.

From the forward end of the dough piece conveyor C, the formed dough pieces are deposited in intermittently arrested pans P conveyed by a pan conveyor E and are subjected to a spray of oil from an oil spraying means F.

The apparatus is supported by a framework including pairs of laterally spaced vertical forward, intermediate and rearward frame members 10, 12 and 14 with the frame members 12 and 14 being higher than the frame members 10. A number of longitudinal and cross frame members, some of which will be adverted to later in the description connect the vertical frame members 10, 12 and 14. The various frame members are formed of angle irons, channel irons or other suitable stock and are secured together by welding, bolts or other suitable means to provide a rigid frame structure.

The dough ball distributor A straddles and is mounted on longitudinal frame members 16 connecting the upper ends of the vertical frame members 12 and 14. Dough balls in single file are successively delivered to the upper end of distributor A from hopper 18. As shown and described in my above referred to patents, the distributor A arranges the dough balls into four rows, dropping sucessively into the transversely spaced chutes 20, 22, 24 and 26. The chutes 20, 22, 24 and 26 are supported by the distributor A and extend downwardly and forwardly therefrom to direct the dough balls into the bight of a pair of flattening and sheeting rolls 28 and 30.

Sheeting rolls 28 and 30 are secured on shafts 32 and 34 journaled at their ends in suitable bearings carried by bearing plates 36 and 38. The bearing plates 36 and 38 span and are secured, by welding or other suitable means, to the upper inner sides of the vertical frame members 12 and 14. A hinged or removable cover plate 40 spans and is carried by the upper outer sides of the vertical frame members 12 and 14, providing between the bearing plate 38 and cover plate 40, a compartment 42 for accommodating drive means for the sheeting roll shafts 32 and 34, and other components of the apparatus as hereinafter described.

Figure 3:
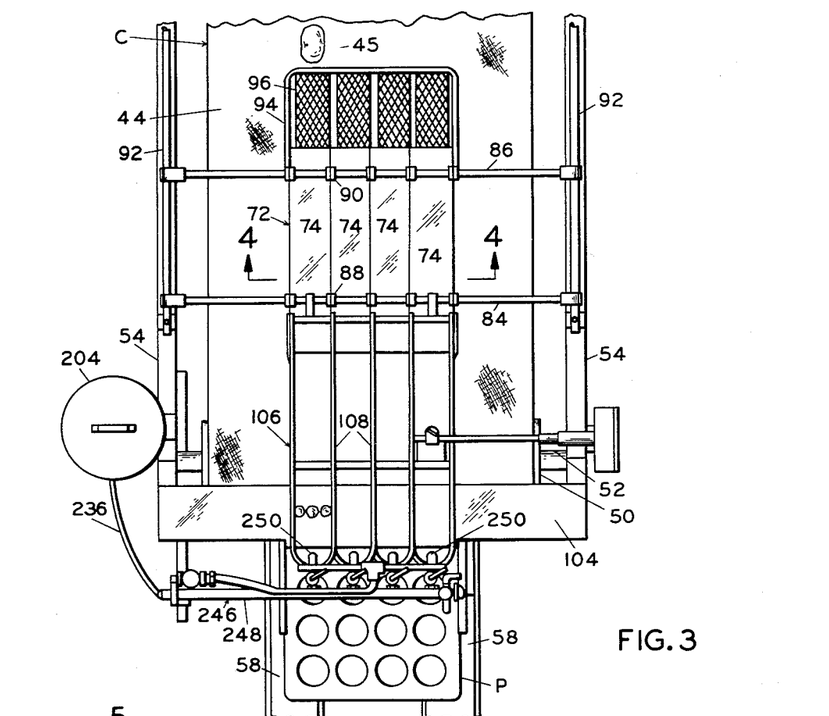
FIGURE 3 is a fragmentary plan view of the forward or left hand end portion of the machine shown in FIGURE 1.

The dough pieces, which as previously noted are flattened into pancake-like form by the sheeting rolls, now drop in four rows onto the endless belt 44 of the dough piece conveyor C. The dough pieces in each row are in longitudinal alignment, however, with the flip-flop type distributor here employed, they are not in transverse alignment but the dough pieces in each longitudinal row will be staggered with respect to the dough pieces in each of the other longitudinal rows. One such flattened dough piece is shown in FIGURE 3 at 45 on the endless dough conveying belt 44 in one of the longitudinal rows.

The dough piece conveyor C includes a rearwardly disposed roller 46 secured on a shaft 48 journaled in suitable bearings carried by the bearing plates 36 and 38, and a forwardly disposed roller 50 secured on a shaft 52 journaled in suitable bearings carried by the forward ends of longitudinal frame members 54. These frame members 54, one at each side of the apparatus, have their forward end portions resting and rigidly secured on the upper ends of the vertical forward frame members 10; and have their rearward ends abutting and rigidly secured to the vertical intermediate frame members 12 intermediate their upper and lower ends. The endless belt 44 extends about the rollers 46 and 50 and is driven by the rear roller 46 by means to be described. Immediately beneath the upper run of the belt 44 is a backing or support plate 56 that extends transversely between and is suitably secured to the frame members 54, and extends longitudinally a substantial length of the upper run of belt 44.

The dough pieces after being formed in the manner to be described, are discharged from the forward end of the dough piece conveyor C and deposited in intermittently arrested pans conveyed by the pan conveyor E which is disposed at a level below the dough piece conveyor C. The pan conveyor E extends rearwardly beyond the rearward end of the dough piece conveyor C to provide an empty pan loading station, and extends forwardly beyond the forward end of the dough piece conveyor C to accommodate the loaded pans.

Figure 7:
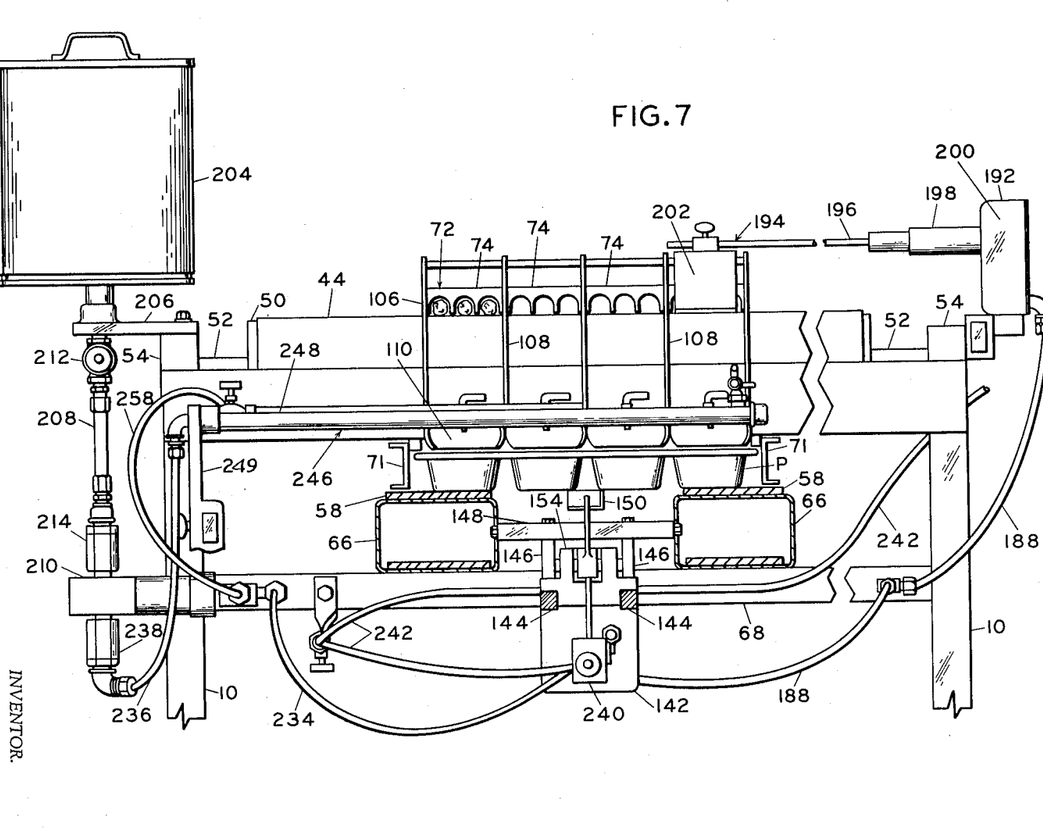
FIGURE 7 is a front end elevation of the device shown in FIGURE 1 with parts shown in section.

The pan conveyor E includes a pair of laterally spaced endless belts 58 running over driving pulleys 60 at the rearward end of the pan conveyor E and idler pulleys (not shown) at the forward end of the pan conveyor E. The two driving pulleys 60 are mounted on a shaft 62 supported in suitable bearings carried by bearing plates 64 secured to and extending rearwardly of the belt supporting longitudinally extending laterally spaced beams 66. The beams 66 are preferably box-like in cross section, as best shown in FIGURE 2 and 7, and are supported on a cross frame member 68 connecting vertical frame members 10, a cross frame member 70 connecting vertical frame members 12 and a similar cross frame member (not shown) connecting vertical frame members 14. Longitudinally extending guide rails 71 keep the pans P positioned on the belts 58, the guide rails 71 preferably being adjustably mounted in well known manner, to accommodate pans of different size.

Figure 4:
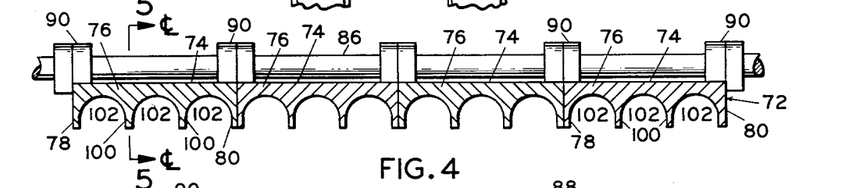
FIGURE 4 is a sectional view of the roll moulding and dividing plate taken on line 4—4 of FIGURE 3.
Figure 5:
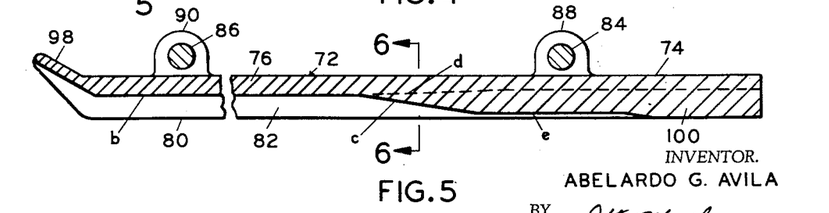
FIGURE 5 is a sectional view taken on line 5—5 of FIGURE 4.

The coiling, kneading and forming means D includes a pressure board 72, and as best shown in FIGURES 3, 4 and 5 is preferably composed of four rectangular kneading and forming pressure board sections 74 extending longitudinally of the upper run of the belt 44 and arranged side by side transversely of the belt. Each of the sections 74 has a top wall 76 and side walls 78 and 80 depending from the opposite longitudinal side edges of the top wall 76 to form therewith a downwardly opening channel 82. In assembled relation, the sections 74 are supported above the belt 44, with the bottom edges of their side walls 78 and 80 providing a slight clearance with the surface of the belt 44, and the side walls 78 and 80 of adjacent sections 74 being in abutting relation.

The means for supporting the pressure board sections 74 includes fore and aft transversely extending rods 84 and 86 extending through fore and aft series of aligned lugs 88 and 90 projecting upwardly from the top walls 76 of the sections 74. The ends of the rods 84 and 86 are connected in any suitable manner to longitudinally extending rods 92 mounted on top of the longitudinally extending frame members 54.

The pressure board sections 74 are disposed on the rods 84 and 86 in alignment with the rows of dough pieces conveyed by the belt 44, and the width of the channels 82 is such as to accommodate the width of the dough pieces.

Mounted on the rearward end of the pressure board 72 is a U-shaped coiling mat support 94 to which four coiling mats 96 are secured in alignment with the channels 82 of the pressure board sections 74. The free ends of the coiling mats drag on the belt 44, and function in well known manner to roll up the pancake-like dough sheets, as they are advanced beneath the mats 96 by the belt 44, into convoluted or jellyroll-like form.

From the coiling mats 96, the coiled dough pieces are conveyed by the belt into the channels 82 of the pressure board sections 74. The rearward end portions 98 of the top walls 76 of the pressure board sections 74 are upturned to facilitate entrance of the coiled dough pieces beneath the top walls 76. Referring particularly to FIGURE 5, it will be noted that the underside of the top walls 76 of the pressure board sections 74 for approximately the rearward third of the length of the sections have a planar surface $b$ between the side walls 78 and 80. In this portion, the coiled dough pieces are gently kneaded and extended to the width of the channel 82.

For the forward two thirds of the length of the sections 74, the under sides of the top walls 76 are provided with a pair of longitudinally extending depending ribs 100 dividing the channel 82 into three sub-channels 102 of equal width. For approximately the rearward third of their lengths, the ribs 100 slope downward and forwardly as at $c$ from the planar surface $b$ to a point short of the plane of the bottom edges of the sidewalls 78 and 80 of the pressure board sections 74. The underside of the top wall 76 of the pressure board sections 74 between the sloping rib portion $c$, designated $d$, changes from a planar to an arcuate shape so that in cross section the sub-channels 102 are inverted U-shaped, and at the same time the portion $d$ slopes upwardly so that the area occupied by the ribs is compensated for by the increasing height of the channel.

Figures 6, 10:
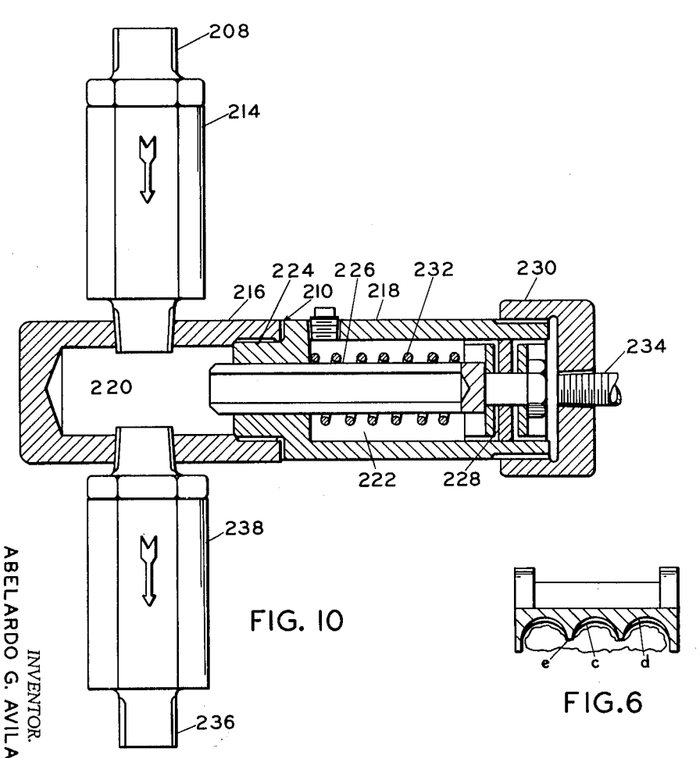
FIGURE 6 is a sectional view taken on line 6—6 of FIGURE 5.
FIGURE 10 is an enlarged sectional view of the oil metering device.

As a coil of dough is advanced by the belt 44 through the portion of a pressure board section 74 designated by $c$ and $d$, the portions of the coil of dough engaging the ribs 100 is gradually depressed to form three bulbous dough portions connected by necks of dough as best shown in FIGURE 6. The gradual depressing action of ribs on the dough coil stretches the skin of the dough coil over the depressed portions of the dough, thereby preventing a cutting action on the dough and exposing of the raw sticky inner portion thereof. The confining arcuate underside of the top wall 76 together with the side walls 78 and 80 and the sides of the ribs 100 effect a rounding and moulding action on the bulbous portions of the dough as the dough piece is advanced by the belt 44.

From the forward end of the section $d$ to the forward end of the pressure board section 74, the arcuate underside of the top wall 76 remains unchanged, and the height of the ribs 100 remains unchanged through an intermediate portion designated $e$. As the dough piece progresses through this section, the bulbous portions of the dough piece are further rounded and moulded while still connected by the neck pieces of the dough, so that the three bulbous portions of the dough are retained in close transverse alignment precluding one bulbous portion from getting ahead of another bulbous portion.

At the forward end portion $f$, the height of the ribs 100 is increased to terminate in the plane of the lower edges of the pressure board section side walls 78 and 80, and as the dough piece passes through this portion, the necks of dough are severed, to form three balls of dough.

At the delivery end of the belt 44 adjacent the roller 50 is mounted a stationary inclined delivery plate 104 down which the three dough pieces emerging from each of the pressure board sections 74 roll and are dropped into a depression in a pan P. The inclined plate 104 is secured at its ends to the forward ends of the longitudinal frame members 54 in any suitable manner.

In order to maintain the three dough balls emerging from each of the pressure board sections 74 together and guide them to an appropriate pan depression, a guide chute 106 is provided which extends forwardly from the end of the pressure board 72 over the forward portion of the belt 44 and then slopes downwardly across the delivery plate 104. The guide chute 106 comprises a plurality of longitudinally extending plates 108 spaced transversely a distance apart to provide guideways registering with the channels 82 of the pressure board 72. Immediately forward of the delivery end of the inclined delivery plate 104, the lower forward ends of the guide chute plates 108 are connected by arcuate plate portions 110 which deflect the dough balls downwardly into the depressions of a pan P. A pan trip means, to be described, holds a pan in position on the continuously moving pan conveyor belts 58 to receive the dough balls.

The sheeting rolls 28 and 30, the dough piece conveyor C and the pan conveyor E are operated by a motor 112 suitably supported in the rearward lower portion of the frame of the apparatus. A drive chain 114 is trained over a sprocket 116 on motor shaft 118; then under an idler sprocket 120 disposed in the lower forward portion of the drive compartment 42; then over a sprocket 126 disposed in the compartment 42 and mounted on an extension of the sheeting roll shaft 32; then under a sprocket 128 disposed in the compartment 42 and mounted on an extension of the sheeting roll shaft 34; then over an idler sprocket 129; then over a sprocket 130 disposed in the compartment 42 and mounted on an extension of the dough belt roller drive shaft 48; and then over a sprocket 132 disposed in the compartment 42 and mounted on a stub shaft 134 journaled in the bearing plate 38.

Also mounted on the stub shaft 134, between the bearing plate 38 and the pan belt support beam 66 is a sprocket 136 which is operatively connected with a sprocket 140 mounted on the pan belt pulley shaft 62, through the sprockets 135, 137 and sprocket chains 138, 139, whereby the pan conveyor belts 58 are driven.

As previously pointed out, trip means is provided for intermittently arresting pans P on the pan conveyor belts 58 to permit a transverse row of pan depressions to receive the formed dough pieces. The trip means and the means for controlling its operation is now described in detail.

Figure 8:
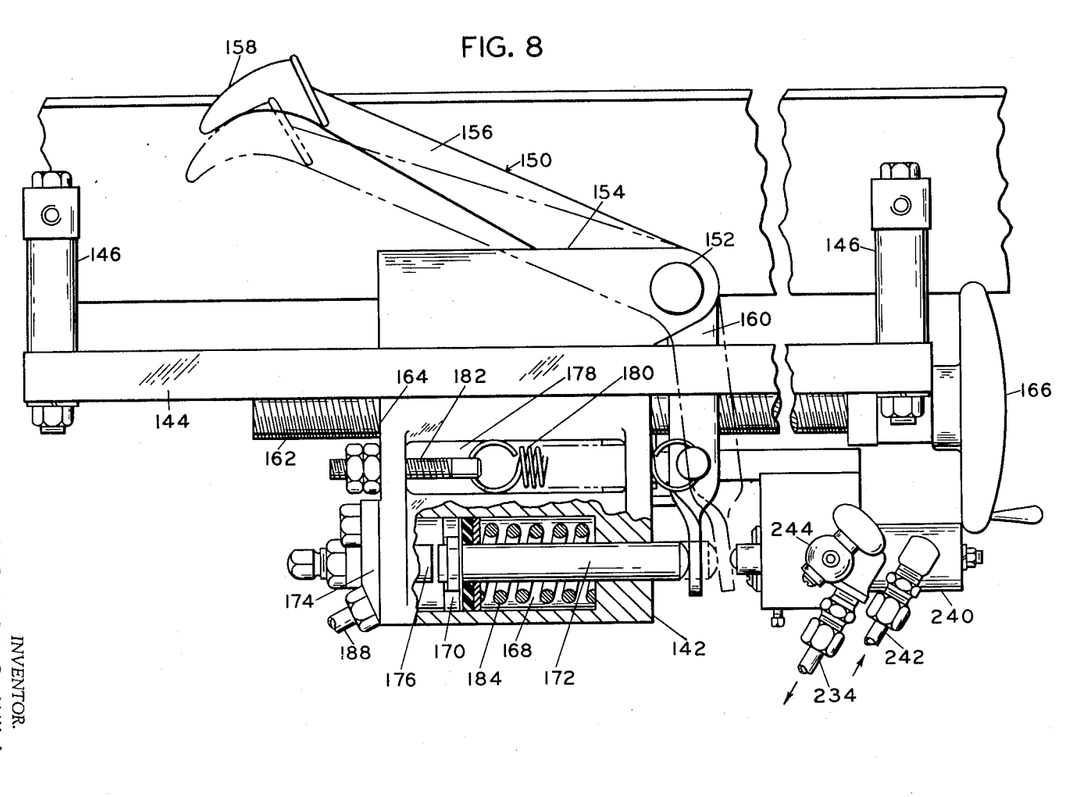
FIGURE 8 is an enlarged view of the pan trip mechanism with parts broken away and shown in section.

Referring particularly to FIGURES 1, 7 and 8, a carriage block 142 is supported between and below the pan belt support beams 66 for longitudinal sliding movement along the longitudinally extending laterally spaced guide bars 144. The guide bars 144 are secured at their ends to the lower ends of the vertical studs 146, which in turn are secured at their upper ends to transverse support bars 148 extending between and fastened at their ends to the pan belt support beams 66. A pan trip 150 in the form of a bell crank is pivotally mounted on a horizontal stub shaft 152 which is supported in a pair of bracket lugs 154 at the upper forward end of the carriage block 142. The bell crank pan trip 150 has an arm 156 extending upward and rearward from its pivot and has at its free end a pan engaging finger 158, which as hereinafter explained is adapted to swing upwardly into the path of a transverse row of pan depressions to stop a pan and to swing downwardly out of such path to permit the pan to be carried forward by the pan conveyor belts 58. Such movement is transmitted to the pan engaging finger 158 through the depending arm 160 of the bell crank pan trip 150 which extends downward from its pivot in front of the carriage block 142.

In order to locate the finger 158 to stop different types of pans P with the depressions therein in the proper position for receiving the dough pieces, the carriage block supporting the pan trip 150 is longitudinally slidably adjustable on the guide bars 144. For this purpose a threaded shaft 162 passes longitudinally through a correspondingly threaded bore 164 in the carriage block, the shaft 162 being suitably mounted to the framework of the machine for rotational movement but fixed against longitudinal movement, so that upon turning the handwheel 166 fixed to the forward end of the shaft 62, the carriage block 142 and the pan trip 150 supported thereon are longitudinal movable to desired adjusted position.

The means for moving the pan trip 150 between pan engaging and pan disengaging position includes a horizontal cylindrical air chamber 168 in the lower portion of the carriage block 142, within which is a piston 170 mounted on one end of a piston rod 172. The free end of the piston rod 172 extends through the front wall of the chamber 168 and engages the lower end of the pan trip arm 160. The other end of the chamber 168 is closed by a plug 174 which has projecting therethrough an adjustably threaded stop member 176 for limiting the movement of the piston 170 in one direction. The carriage block 142 has a recess 178 formed therein above the chamber 168 for receiving a light coil spring 180, one end of which is secured to an adjustable threaded stud 182. The other end of the spring 180 is attached to the pan trip arm 160 for urging it toward its full line position, as shown in FIGURE 8. A coil spring 184 encircles the piston rod 172 between the piston 170 and the end wall of the chamber 168 for urging the piston into engagement with the stop member 176. The plug 174 is formed with an air port to which is connected a flexible air line 188 that leads from a suitable source of compressed air, in which line is interposed an air pressure regulator 190 set at preferably about 20 to 25 p.s.i. and a dough trip actuated control valve 192, as best shown in schematic FIGURE 9. The dough trip 194 and its function will now be described in more detail.

The dough trip 194 includes a transversely extending rod 196 rotatably mounted in a bearing 198 carried by the housing 200 for the control valve 192. One end of the rod 196 projects into the housing 200 where it is operatively associated with the control valve 192, and the other end of the rod 196 supports a flap 202 which extends downwardly into a guideway of the guide chute 106 in the path of the formed dough pieces delivered from the pressure board section 74 in line with the chute guideway. The control valve 192 and its operative connection with the rod 196 may take any suitable form, preferably as shown in Patent No. 2,696,334, granted December 7, 1954, to H. C. Rhodes, and the details thereof are therefore not shown or described herein.

When the formed dough pieces are moved by the belt 44 through the chute guideway in which the flap 202 is disposed, the flap 202 is momentarily raised, thereby causing the rod 196 to be rotated. Rotation of the rod 196 actuates the control valve 192 whereby air is delivered through line 188 and air pressure regulator 190 to the chamber 168 in carriage block 142 at the left of the piston 170, as viewed in FIGURE 8, causing the piston rod 172 to move to its extended position which in turn swings the pan trip 150 from its full line pan engaging position to its broken line pan disengaging position. This allows the pan P to be moved forward by the continuously moving pan conveyor belts 58. As soon as the formed dough pieces have passed beyond the flap 202, it drops back to its original position to actuate the control valve 192 to permit air in the chamber 168 to exhaust through the line 188. The piston 170 and piston rod 172 are thereupon returned to retracted position by the spring 184, and the spring 180 then returns the pan trip 150 to its pan engaging position where it engages the next transverse row of pan depressions to stop the pan in position to receive the formed dough pieces that tripped the flap 202. The remaining pan depressions in that transverse row are thereupon filled with formed dough pieces delivered through the remaining three chute guideways, after which the flap is again tripped to again effect forward movement of the pan.

The engagement of the formed dough pieces with the flap 202 of the dough trip 194, which as above described initiates operation of the pan controlling means, simultaneously initiates operation of an oil spray means for directing a spray of oil onto the dough pieces deposited in the transverse row of pan depressions. This means and the functioning thereof will now be described in detail.

An oil supply container 204 is supported by a bracket 206 on the forward end of the frame member 54 at the side of the apparatus opposite the dough trip 194, as best shown in FIGURE 7. Extending downwardly from the bottom of the oil container 204 is an oil line 208 for delivering oil to an oil metering cylinder 210. Interposed in the oil line 208 is a shut-off valve 212 and a normally open check valve 214. Such valves are of well known construction and the details thereof are not shown nor need they be described.

The metering cylinder 210, referring particularly to FIGURE 10, comprises body members 216 and 218 suitably secured together and providing communicating chambers 220 and 222. Communication is provided between the chambers 220 and 222 through an internal sleeve 224 which forms a guide for the bifurcated hollow stem 226 of a plunger 228 mounted for reciprocation in the chamber 222. A cap 230 provides a closure for the end of the chamber 222 of body member 218 opposite the sleeve 224. The plunger 228 is normally urged to the right, as shown in FIGURE 10, by a compression spring 232 disposed in the chamber 222 between the sleeve 224 and the plunger 228, and encircling the stem 226. In this position of the plunger 228, oil from the container 204 fills the chambers 220 and 222. When air under pressure is admitted to the right hand side of the plunger 228 through air line 234, the plunger 228 moves to the left, as viewed in FIGURE 10, whereupon the pressure exerted against the oil causes check valve 214 to close and forces a metered amount of oil to flow from the chamber 220 into oil line 236, which is maintained full of oil. In being forced through the oil line 236, the oil opens normally closed check valve 238 interposed in line 236.

Figure 9:
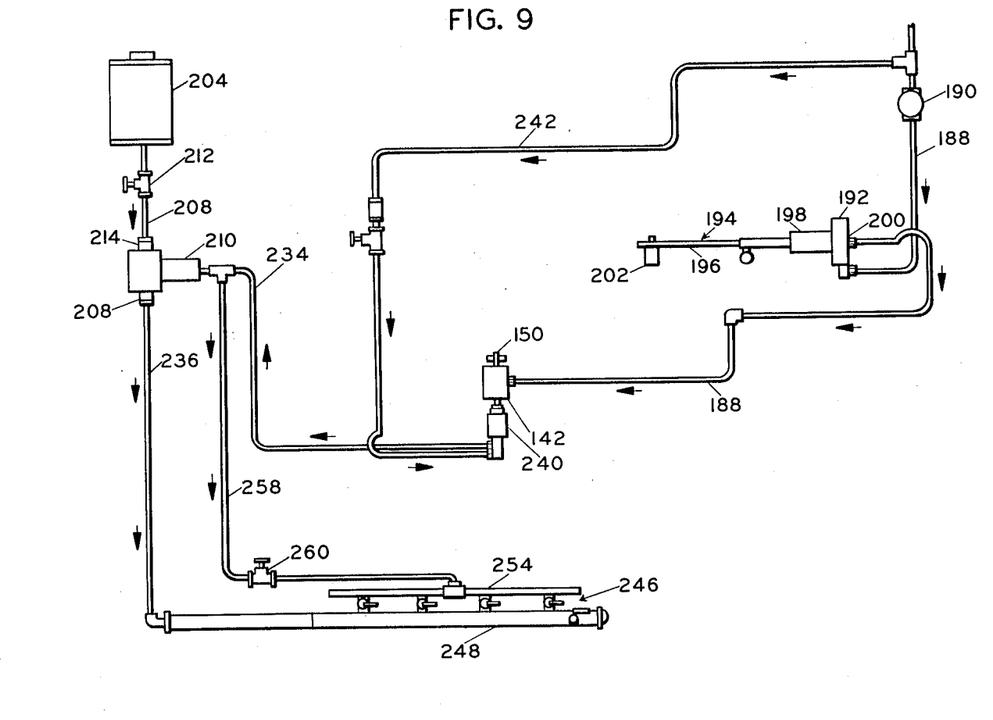
FIGURE 9 is a diagrammatic view of the oil and air piping arrangement.
Figure 11:
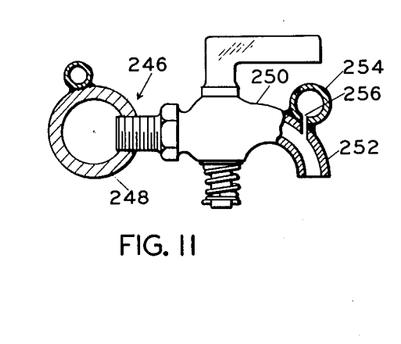
FIGURE 11 is a sectional view through the oil dispensing manifold and nozzle, parts being shown in elevation.

Delivery of air through the air line 234 from a source of compressed air to the rear of the plunger 228 to discharge a metered amount of oil, and exhaust of air from the rear of the plunger 228 to permit return thereof to its original position by the spring 232, it controlled by a control valve 240, which in turn is controlled by the pan trip operating piston rod 172, as best shown in FIGURES 8 and 9. Air under pressure from a suitable source of supply is delivered to the valve 240 through an air line 242.

When the piston rod 172 is moved to the right, as shown in FIGURE 8, in response to actuation of the dough trip 194 as previously explained, to move the pan trip 150 to its dotted line pan disengaging position, air control valve 240 is simultaneously actuated to momentarily admit air to the cylinder 210 to effect discharge of a metered amount of oil. When the piston rod 172 is moved to the left, the valve 240 is actuated to cut off the supply of air under pressure from the source of compressed air, and at the same time air from the cylinder 210 is exhausted through an exhaust fitting 244 of the valve 240.

Upon discharge of the metered amount of oil from the metering cylinder 210 into the line 236, an equal amount of oil is discharged from the oil dispensing means 246 with which the line 236 is connected, it being understood as above stated, that the line 236 is filled with oil as also is the manifold 248 of the oil dispensing means 246. The manifold 248 is supported by bracket means 249 and extends transversely over the pan conveyor belts 58 and the pans carried thereon and forward of the arcuate portions 110 of the dough chutes 106 that deflect the dough pieces into the pan depressions, as best shown in FIGURES 3 and 7. Referring particularly to FIGURES 3 and 10, four nozzles 250 are secured to and communicate with the manifold 248. The nozzles 250 are spaced laterally in alinement with the dough chutes 106, and extend rearwardly from the manifold 248, terminating in a downturned portion 252 directed toward the pan depressions that are in position to receive the dough pieces deflected downwardly by the arcuate portions 110 of the dough chutes 106.

Means is provided for atomizing the charge of oil issuing from the nozzles 250 of the oil dispensing means 246. For this purpose a transversely extending air pressure manifold 254 is welded to the nozzles 250 adjacent the upper end of their downturned portions 252, and ports 256, as best shown in FIGURE 1, in the adjacent wall portions of the manifold 254 and nozzles 250 directed toward the nozzle discharge opening, atomize the oil discharged from the nozzle to direct a spray of oil on the dough pieces in the pan depressions. Air under pressure is delivered to the manifold 254 by a branch line 258, which communicates with air line 234 as shown in FIGURE 9, so that when air under pressure is delivered to the oil metering cylinder 210 to discharge a metered amount of oil from the nozzles 250, as previously described, air under pressure is simultaneously discharged into the nozzles 250 to atomize the metered amount of oil discharged. A valve 260 in the air line 258, see FIGURE 9, is manually adjustable to regulate the amount of atomizing air delivered to the manifold 254.

In operation, it will be seen from the above description, assuming a transverse row of pan depressions has been filled with dough pieces, the dough trip 194 is actuated by the following dough pieces. The dough trip 194 actuates the air control valve 192, as previously explained, to deliver a charge of air to the operating means of the pan trip 150, causing the latter to momentarily disengage the pan P and allow it to move forward. The air control valve 240, which is controlled by the operation of the pan trip operating means as previously explained, simultaneously effects operation of the oil dispensing means 246 to discharge a metered amount of oil and delivers air to the manifold 254 for atomizing the charge of oil, in the manner described above. The spray of atomized oil is directed directly onto the dough pieces in the pan depressions. The apparatus is now ready to repeat the operation for the next row of dough pieces delivered to the pan depressions.

I claim:

1. In a device of the class described a conveyor for conveying a plurality of longitudinal laterally spaced rows of dough pieces, a conveyor mounted beneath said dough piece conveyor to transport dough receiving pans having a plurality of longitudinal laterally spaced rows of pan depressions in linear alinement with the longitudinal rows of dough pieces, means for intermittently arresting the forward movement of said pans to bring successive transverse rows of pan depressions subjacent the discharge end of said dough piece conveyor for receiving dough pieces therefrom, oil dispensing means including a container for oil and a nozzle disposed in vertical alinement with each depression of a transverse row of pan depressions in arrested dough piece receiving position, an oil line extending from said container to said nozzles, oil displacing means interposed in said line including an air operated cylinder and a piston therein having a limited displacement for forcing a metered amount of oil through said line and said nozzles, an air trunk line adapted to be connected to a source of air under pressure, air branch lines leading from said air trunk line to said oil metering cylinder and said nozzles, a normally closed valve in said air trunk line, means actuated by dough pieces in one of said longitudinal rows for releasing said pan arresting means, and means actuated by said pan arresting means upon movement to pan releasing position for simultaneously opening the valve in said air trunk line for delivering air under pressure through said air branch lines to said oil metering cylinder and said nozzles to direct a metered amount of oil in spray form from said nozzles on said deposited dough pieces.

2. In a device of the class described, a continuously moving conveyor belt for conveying a plurality of longitudinal laterally spaced rows of dough pieces, means disposed over said conveyor belt and cooperating therewith to divide and mould successive dough pieces in each of said longitudinal rows into groups of smaller dough balls, an endless conveyor mounted beneath and extending forward of the discharge end of said dough conveyor belt to transport dough pans into position for receiving groups of dough balls from said dough conveyor belt, a downwardly sloping plate forming a guide support for said groups of dough balls between the discharge end of said dough conveyor belt and said pans, and chute means for maintaining the individual dough balls in each group together and for maintaining the groups in separate longitudinal rows as they are transported from said dividing and moulding means to said pans, said chute means having longitudinal laterally spaced upright walls forming a plurality of channels open at their rearward ends adjacent the delivery end of said dividing and moulding means for receiving groups of dough balls therefrom, said upright walls extending forwardly to the discharge end of said dough belt and at a downward angle across said downwardly sloping dough ball support plate, the forward end of said chute means projecting forwardly beyond said sloping support plate and in vertical spaced relation with respect to a pan carried by said pan conveyor, the forward end of said chute means having arcuate transversely extending upright walls forming closures for the front ends of said channels to deflect the groups of dough balls from said channels downwardly on said pans.

3. A device as set forth in claim 2 including oil dispensing means having a transverse row of spaced nozzles disposed in vertical alinement with the groups of dough balls deflected on to a pan by said chute means to direct a spray of oil on said deposited groups of dough balls.

4. A device as set forth in claim 2 including means for intermittently arresting the forward movement of the pans for receiving successive transverse rows of groups of dough balls, oil dispensing means having a transverse row of spaced nozzles disposed in vertical alinement with the groups of dough balls deflected on to a pan by said chute means, and means for releasing said pan arresting means after deposition of a transverse row of groups of dough balls and simultaneously actuating said oil dispensing means to direct a spray of oil from said nozzles on said deposited groups of dough balls.

5. In a device of the class described, a continuously moving conveyor belt for conveying a plurality of longitudinal laterally spaced rows of dough pieces, means disposed over said dough conveyor belt and cooperating therewith to divide and mould successive dough pieces in each of said longitudinal rows into groups of smaller dough balls, said means including channel defining walls for maintaining the dough pieces in separate longitudinal rows, an endless conveyor mounted beneath said dough conveyor belt to transport dough pans having a plurality of longitudinal laterally spaced rows of pan depressions in linear alinement with the longitudinal rows of dough pieces, means for intermittently arresting the forward movement of said pans to bring successive transverse rows of pan depressions subjacent the discharge end of said dough conveyor belt for receiving dough pieces therefrom, chute means forming laterally adjacent longitudinal channels extending forwardly from and registering with the delivery end of the channels of said dividing and moulding means and projecting beyond the discharge end of said dough conveyor belt over respective depressions of a transverse row of pan depressions for maintaining the individual dough balls in each group together and for maintaining the groups in separate longitudinal rows as they are transported from said dividing and moulding means to said pans, oil dispensing means including a nozzle disposed in vertical alinement with each depression of a transverse row of pan depressions in arrested dough piece receiving position, means for releasing said pan arresting means after deposition of a transverse row of dough pieces in said transverse row of pan depressions, and means responsive to movement of said pan arresting means to pan release position actuating said oil dispensing means to direct a spray of oil simultaneously from said nozzles on said deposited dough pieces.

References Cited in the file of this patent

UNITED STATES PATENTS

| | | |
|---|---|---|
| 1,704,903 | Russell | Mar. 12, 1929 |
| 1,781,546 | Harber | Nov. 11, 1930 |
| 2,286,983 | Beutel | June 16, 1942 |
| 2,349,423 | Harber | May 23, 1944 |
| 2,633,821 | Koerber | Apr. 7, 1953 |

FOREIGN PATENTS

| | | |
|---|---|---|
| 10,308 | Great Britain | Apr. 30, 1909 |
| 549,854 | Great Britain | Dec. 10, 1942 |
| 641,755 | Great Britain | Aug. 16, 1950 |